Feb. 28, 1967  J. E. MITCHELL  3,306,601
TRANSMISSION STAND
Filed Oct. 6, 1964  2 Sheets-Sheet 1

Jack E. Mitchell
INVENTOR.

BY *Clarence A. O'Brien*
*and Harvey B. Jacobson*
Attorneys

Feb. 28, 1967   J. E. MITCHELL   3,306,601
TRANSMISSION STAND
Filed Oct. 6, 1964   2 Sheets-Sheet 2
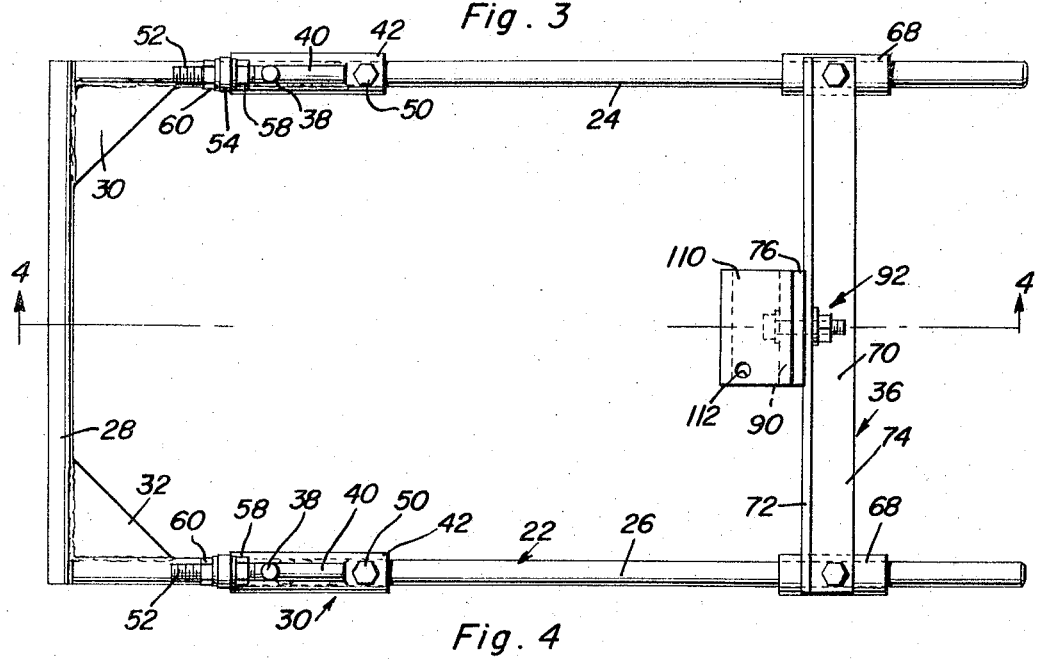
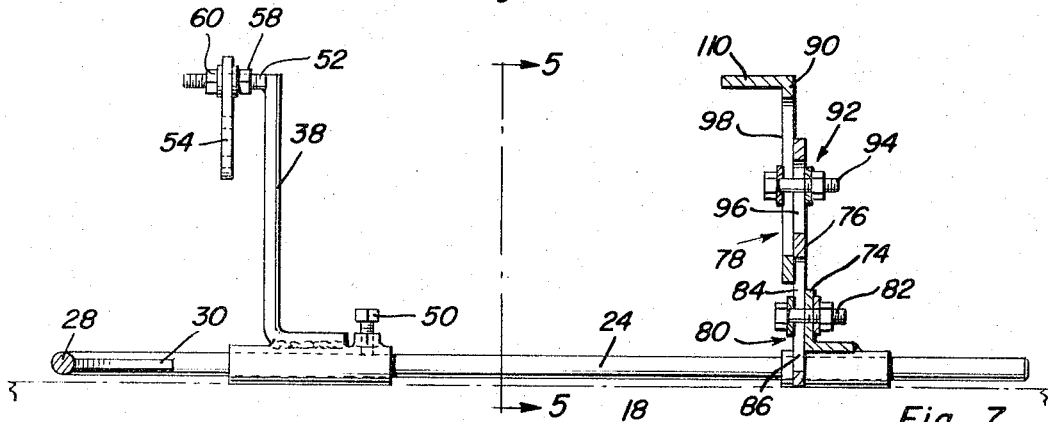
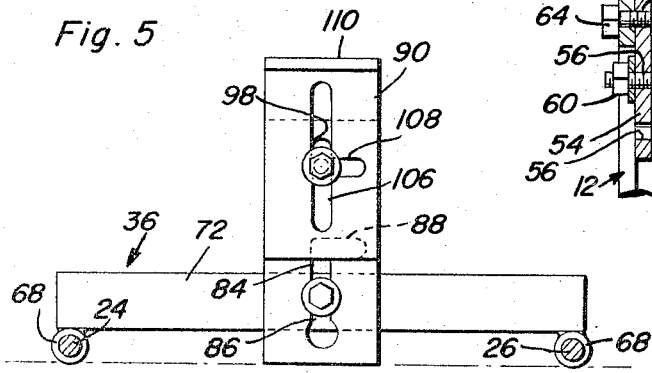
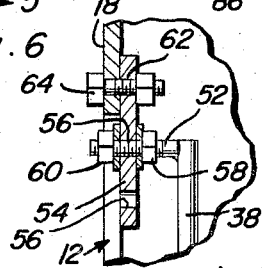
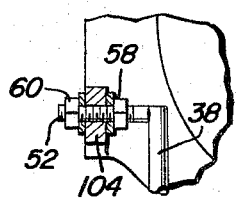
Jack E. Mitchell
INVENTOR.
BY Clarence A. O'Brien
and Harvey B. Jacobson
Attorneys United States Patent Office 3,306,601
Patented Feb. 28, 1967

3,306,601
TRANSMISSION STAND
Jack E. Mitchell, 2306 McDonald,
Missoula, Mont. 59801
Filed Oct. 6, 1964, Ser. No. 401,953
9 Claims. (Cl. 269—50)

This invention relates to a novel and useful transmission stand and more specifically to an apparatus designed primarily to firmly support a vehicle transmission in a convenient working position on a bench while the transmission is being assembled or disassembled.

The transmission stand of the instant invention differs from transmission and/or differential assembly jacks in that it is not designed to assist in the removal of or the installation of a transmission in a vehicle. Although a transmission jack or the like is of course capable of supporting a vehicle transmission, in view of the necessity for a transmission jack to have means for raising and lowering the transmission relative to the surface which supports the jack and means for inclining transmission so as to assist in its removal or installation in the vehicle a transmission jack is too heavy and cumbersome to be utilized on top of a work bench for the purpose of supporting the transmission case while the transmission is being assembled or disassembled.

The main object of this invention is to provide a transmission stand constructed in a manner whereby it is adapted to support substantially all types of transmissions in an elevated position on a workbench.

Another object of this invention is to provide a transmission stand including means which may be readily adjusted so as to adapt the transmission stand to support any transmission housing or case.

A further object of this invention is to provide a transmission stand having sufficient strength of materials and designs so as to be adapted to support exceptionally large transmissions and yet constructed in a manner whereby the weight of the stand will be maintained at a minimum and its operation will be greatly simplified over the operation of transmission jacks.

A final object of this invention to be specifically enumerated herein is to provide a transmission stand in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged top plan view of the assembly illustrated in FIGURE 1;

FIGURE 4 is a longitudinal vertical sectional view taken substantially upon the plane indicated by section line 4—4 of FIGURE 3;

FIGURE 5 is a transverse vertical sectional view taken substantially upon a plan indicated by section line 5—5 of FIGURE 4;

FIGURE 6 is an enlarged fragmentary sectional view taken substantially upon a plane indicated by section line 6—6 of FIGURE 1;

FIGURE 7 is an enlarged fragmentary sectional view taken substantially upon the plane indicated by section line 7—7 of FIGURE 2.

Figure 1:
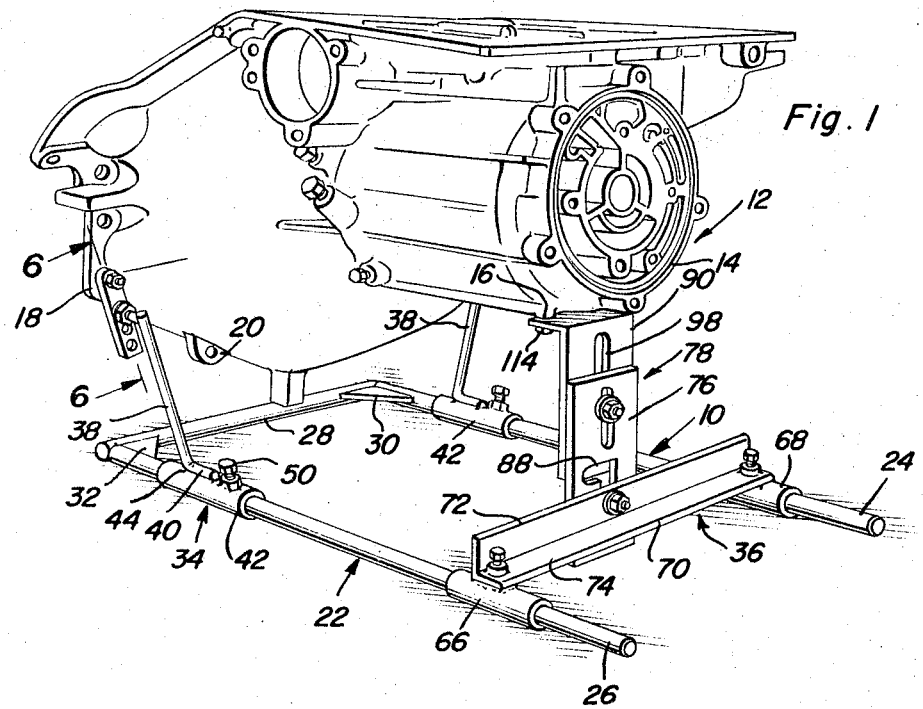
FIGURE 1 is a perspective view of the transmission stand of the instant invention shown supporting a transmission case in an elevated position above a workbench surface.

Referring now more specifically to the drawings the numeral 10 generally designates the transmission stand of the instant invention which is shown in FIGURE 1 of the drawings supporting a transmission case generally referred to by the reference numeral 12 including a rear end portion 14 having a tapped mounting boss 16 and various apertured mounting flanges 18 and 20 on its forward end.

The transmission stand 10 includes a base generally referred to by the reference numeral 22 which defines a longitudinal axis generally paralleling and disposed between the parallel opposite sides 24 and 26 of the base 22. One pair of corresponding ends of the sides 24 and 26 are secured together by means of a transverse bight portion 28 and it may be seen that the corner junctures defined by the intersections of the sides 24 and 26 and the bight portion 28 are reinforced by means of triangular web plates 30 and 32 which are secured to the bight portion 28 and the sides 24 and 26 in any convenient manner such as by welding.

Front and rear support means generally referred to by reference numerals 34 and 36 are provided and it may be seen that the front support means 34 includes a pair of upstanding elongated arm members 38 including laterally directed end portions 40 to which cylindrical sleeves 42 are secured by welding 44. The sleeves 42 include threaded transverse bores 46 into which the shank portions 48 or a pair of setscrews 50 are threadedly engaged. The sleeves 42 are slidably and rotatably received on the sides 24 and 26 and the setscrews 50 are utilized to retain the sleeves 42 in adjusted positions on the sides 24 and 26.

The upper ends of the arm members 38 include laterally directed stub shaft portions 52 which are externally threaded and which have elongated arms 54 secured thereto. The arms 54 include longitudinally spaced bores 56 through which the corresponding stub shaft portion 52 is secured by means of a pair of threaded fasteners 58 and 60. The elongated arms 54 are also provided with bores 62 which are adapted to have fasteners 64 secured therethrough for the purpose of securing the elongated arms 54 to the apertured flange portions 18 of the transmission 12.

It will be noted that the elongated arms 54 may be secured in adjusted rotated positions about the stub shaft portions 52 by means of the threaded fasteners 58 and 60 and also that the axis of rotation of the elongated arms 54 generally parallel the corresponding sides 24 and 26 of the base 22.

The rear support means 36 comprises a pair of cylindrical sleeves 66 and 68 which are rigidly interconnected by means of a transverse brace 70. The cylindrical sleeves 66 and 68 are slidably disposed on the sides 26 and 24 and it may be seen that the transverse brace 70 defines an angle iron including an upstanding flange 72 and a horizontal flange 74.

The vertical flange 72 is suitably apertured as at 74 and has the lower section 76 of a vertically extendable upright generally referred to as reference numeral 78 secured thereto by means of a pin and slot connection generally referred to by the reference numeral 80 including a threaded fastener 82 and an L-shaped slot 84 formed in the lower section 76 of the upright 78. The L-shaped slot 84 includes a long leg 86 and a short leg 88. A lower section 76 of the upright 78 has the upper section 90 secured thereto by means of a pin and slot connection generally referred to by the reference numeral 92 and including a threaded fastener 94 secured through an upstanding slot 96 formed in the lower section 76 and an upstanding slot 98 formed in the upper section 90.

Thus it may be seen that the upper section 90 may be vertically extended relative to the lower section 76 and that the lower section 76 may be vertically extended relative to the transverse brace 70. In addition, the lower section 76 may be swung 90° about the longitudinal axis of the threaded fastener 82 to a retracted position such as that illustrated in FIGURE 2 of the drawings with the threaded fastener 82 being disposed in the free end portion of the short leg 88 of the slot 84. In this position the upright 78 is disposed on its side and adapted to support the rear end portion 100 of a different type of transmission housing 102. It may be seen from FIGURE 2 of the drawings that the transmission housing 102 does include apertured mounting flanges 104 on its forward end and therefore that the upper ends of the arm members 36 may be readily attached to the forward end of the transmission case 102. However, it will be noted that the arms 54 are not needed to support the transmission case 102 and therefore that they have been removed and that the shank portions 52 have been secured directly through the apertured mounting flanges 104.

Figure 2:
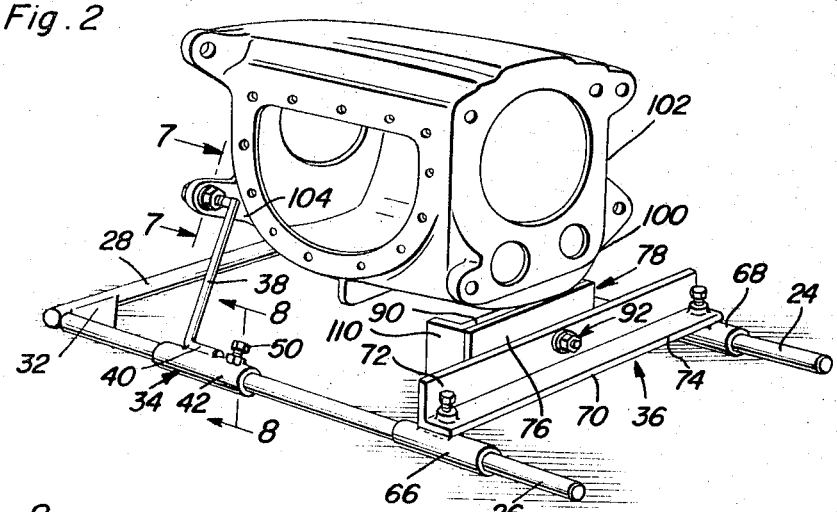
FIGURE 2 is a further perspective view of the transmission stand showing the manner in which it may be readily adjusted so as to support a different type of transmission.
Figure 8:
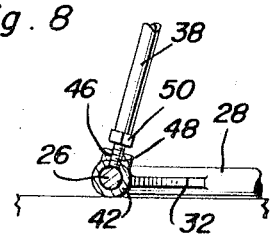
FIGURE 8 is a fragmentary vertical sectional view taken substantially upon the plane indicated by section line 8—8 of FIGURE 2.

The slot 98 formed in the upper section 90 is generally T-shaped as shown in FIGURE 5 of the drawings and includes an upstanding portion or leg 106 and a laterally directed portion or short leg 108. The short leg 108 is similar to the short leg 88 and therefore it may be readily seen that the upper section 90 may be vertically adjusted relative to the lower section 76 even when the upper and lower sections 90 and 76 are horizontally disposed as shown in FIGURE 2 of the drawings.

The upper end of the upper section 90 includes a laterally directed flange portion 110 and the flange portion 110 is suitably apertured as at 112 for the reception of a fastener 114 for securing the rear end portion 14 of the transmission 12 to the upper end of the upright 78.

In operation, the transmission stand 22 may be readily adjusted so as to conform to the mounting means provided on substantially all transmission housings. The front mounting means 34 are disposed on opposite sides of the base 22 and are made thusly inasmuch as substantially all transmission housings include means disposed on opposite sides thereof on at least one end for securing the transmission to an associated part of the vehicle. The remote end of most transmission includes a centrally disposed mount whereby that end of the transmission housing may be suitably supported from the vehicle, the rear support means 36 being constructed so as to be centrally disposed to provide a suitable central support for the associated transmission case.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A transmission stand for support on a work surface and adapted to support a transmission therefrom in elevated position above said work surface, said stand comprising a pair of elongated and generally parallel side members rigidly interconnected at one pair of corresponding ends by means of a transverse member secured to and extending between said one pair of ends, a pair of upstanding support arms pivotally and slidably supported at their lower ends from said side members for independent swinging of the upper ends of said arms about axes generally paralleling said side members and independent shifting of said arms longitudinally of said side members, the free ends of said arms including attaching means adapted to be secured to opposite side portions of one end of a transmission case, and a transmission support member adapted to have the other end of said case rested thereupon, said support member including opposite end portions slidably engaged with the other pair of corresponding ends of said side members for shifting longitudinally thereof and defining a brace extending between the other pair of ends of said side members preventing relative lateral shifting of said other pair of ends toward and away from each other.

2. The combination of claim 1 wherein said support member comprises the sole bracing between said other pair of ends of said side members.

3. The combination of claim 1 wherein said support member is slidable off the terminal ends of said other pair of ends of said side members.

4. The combination of claim 3 wherein said support arms are also slidable off the terminal ends of said other pair of ends of said side members.

5. The combination of claim 1 wherein the lower ends of said support arms include tubular members rotatably and slidably receiving said side members therethrough.

6. The combination of claim 5 wherein said sleeves each include means releasably engageable with said side members and operative to retain said sleeves in longitudinally adjusted positions and rotatably adjusted positions relative to said side members.

7. The combination of claim 1 wherein said lower ends of said support arms include means operative to releasably secure said support arms in longitudinally adjusted positions relative to said side members and rotatably adjusted positions relative to said side members.

8. The combination of claim 1 wherein said transmission support member includes a centrally disposed vertically extendable portion whose upper end portion is adapted to engage and support said other end of said transmission case.

9. The combination of claim 1 wherein said attaching means include a pair of short elongated attaching arms pivotally secured at corresponding ends to the upper ends of said support arms for rotation about axes generally paralleling said side members, the free swingable ends of said attaching arms including means adapted to be attached directly to said transmission case.

References Cited by the Examiner
UNITED STATES PATENTS

| | | | |
|---|---|---|---|
| 2,572,506 | 11/1951 | Mongelli | 248—16 |
| 2,748,165 | 6/1956 | Orr | 269—47 X |
| 2,885,165 | 5/1959 | Smolen | 248—13 |
| 3,198,460 | 8/1965 | Goettl | 248—16 |

WILLIAM W. DYER, JR., *Primary Examiner.*

W. D. BRAY, *Assistant Examiner.*